United States Patent
Van Broeck et al.

(10) Patent No.: US 10,244,185 B2
(45) Date of Patent: Mar. 26, 2019

(54) METHOD AND APPARATUS FOR MIXING A FIRST VIDEO SIGNAL AND A SECOND VIDEO SIGNAL

(71) Applicant: Alcatel Lucent, Boulogne Billancourt (FR)

(72) Inventors: Sigurd Van Broeck, Zoersel (BE); Patrice Rondao Alface, Nivelles (BE); Christoph Stevens, Stekene (BE); Jean-Francois Macq, Ganshoren (BE)

(73) Assignee: ALCATEL LUCENT, Nozay (FR)

( * ) Notice: Subject to any disclaimer, the term of this patent is extended or adjusted under 35 U.S.C. 154(b) by 103 days.

(21) Appl. No.: 14/404,727

(22) PCT Filed: May 23, 2013

(86) PCT No.: PCT/EP2013/060574
§ 371 (c)(1),
(2) Date: Dec. 1, 2014

(87) PCT Pub. No.: WO2013/178522
PCT Pub. Date: Dec. 5, 2013

(65) Prior Publication Data
US 2015/0147046 A1    May 28, 2015

(30) Foreign Application Priority Data
Jun. 1, 2012  (EP) .................................... 12305618

(51) Int. Cl.
*H04N 5/265* (2006.01)
*H04N 21/234* (2011.01)
(Continued)

(52) U.S. Cl.
CPC ............. *H04N 5/265* (2013.01); *G06T 19/20* (2013.01); *G11B 27/036* (2013.01);
(Continued)

(58) Field of Classification Search
None
See application file for complete search history.

(56) References Cited

U.S. PATENT DOCUMENTS 4,661,986 A * 4/1987 Adelson ............... G01R 23/167
348/356
4,692,806 A * 9/1987 Anderson ............... G06T 3/403
375/240.08
(Continued)

FOREIGN PATENT DOCUMENTS

EP          2424251 A2    2/2012
JP       H3179994 A     8/1991
(Continued)

OTHER PUBLICATIONS

International Search Report for PCT/EP2013/060574 dated Jul. 23, 2013.

*Primary Examiner* — Mohammad J Rahman
(74) *Attorney, Agent, or Firm* — Fay Sharpe LLP

(57) ABSTRACT

A method for mixing a first video signal and a second video signal, the method comprising at a mixing device receiving the first video signal; receiving the second video signal; receiving a transformation information signal dividing the first video signal into a transparent region and a non-transparent region and representing a spatial relationship between the first video signal and the second video signal; transforming the second video signal in accordance with the transformation information signal; and combining the non-transparent region of the first video signal with a portion of the transformed second video signal, the portion of the transformed second video signal being rendered in the transparent region of the first video signal.

19 Claims, 4 Drawing Sheets

(51) Int. Cl.
    *H04N 5/262*     (2006.01)
    *H04N 13/00*     (2018.01)
    *G11B 27/036*     (2006.01)
    *H04N 13/156*     (2018.01)
    *G06T 19/20*     (2011.01)
    *H04N 13/194*     (2018.01)
    *H04N 13/183*     (2018.01)
    *H04N 13/178*     (2018.01)

(52) U.S. Cl.
    CPC ......... *H04N 5/2628* (2013.01); *H04N 13/156* (2018.05); *H04N 13/178* (2018.05); *H04N 13/183* (2018.05); *H04N 13/194* (2018.05); *H04N 21/23424* (2013.01); *G06T 2219/2004* (2013.01)

(56) References Cited

U.S. PATENT DOCUMENTS

| | | | | |
|---|---|---|---|---|
| 4,703,514 A * | 10/1987 | van der Wal | ............ | G06F 17/10 358/447 |
| 5,140,416 A * | 8/1992 | Tinkler | ...................... | G06T 5/50 250/332 |
| 5,325,449 A * | 6/1994 | Burt | ........................... | G06T 5/50 348/E7.086 |
| 6,249,285 B1 * | 6/2001 | Madden | ................. | G06K 9/209 345/419 |
| 6,522,787 B1 | 2/2003 | Kumar et al. | | |
| 6,571,019 B1 * | 5/2003 | Kim | ........................... | G06T 9/20 375/240.23 |
| 7,212,198 B2 * | 5/2007 | Muraki | .................... | G06T 15/08 345/419 |
| 2004/0091084 A1 * | 5/2004 | Griffith | .................... | G06T 15/08 378/210 |
| 2005/0231532 A1 | 10/2005 | Suzuki et al. | | |
| 2010/0265401 A1 * | 10/2010 | Yuki | ........................ | G09G 5/14 348/565 |
| 2010/0315489 A1 | 12/2010 | Shepherd | | |
| 2012/0050309 A1 * | 3/2012 | Tsuchida | ................ | G09G 5/377 345/592 |

FOREIGN PATENT DOCUMENTS

| | | |
|---|---|---|
| JP | H6176131 A | 6/1994 |
| JP | H7282294 A | 10/1995 |
| JP | H11259672 A | 9/1999 |
| JP | 2001148851 A | 5/2001 |
| JP | 2005/165614 A | 6/2005 |
| JP | 4400143 B2 | 11/2009 |

\* cited by examiner view A

Top view view B view C

METHOD AND APPARATUS FOR MIXING A FIRST VIDEO SIGNAL AND A SECOND VIDEO SIGNAL

FIELD OF THE INVENTION

The present invention relates to the field of video processing, and in particular to the field of mixing video signals.

BACKGROUND

A number of known multimedia editing tools provide some form of video overlay functionality. These functions allow a user to overlay text on video, picture on video, photo on video, video on video (PIP), or graphics on video.

Known solutions use a layered approach wherein the different multi-media formats appear in layers on top of each other. Once the resulting video is encoded, the layers are no longer available separately. When a different camera angle is needed for stereo or multiview 3D, one or more different video streams need to be generated and the resulting videos need to be encoded as one.

SUMMARY

It is an object of embodiments of the present invention to overcome some of the above mentioned disadvantages.

According to an aspect of the invention, there is provided a method for mixing a first video signal and a second video signal, the method comprising at a mixing device: receiving the first video signal; receiving the second video signal; receiving a transformation information signal dividing the first video signal into a transparent region and a non-transparent region and representing a spatial relationship between the first video signal and the second video signal; transforming the second video signal in accordance with the transformation information signal; and combining the non-transparent region of the first video signal with a portion of the transformed second video signal, the portion of the transformed second video signal being rendered in the transparent region of the first video signal.

It is an advantage of the present invention that mixing of video signals is made possible with preservation of the spatial relationship between the first video signal and the second video signal. Thus, the resulting mixed video will have a more natural look, as the mixed-in second video signal will be appropriately transformed in accordance with modifications of the first video signal such as pan, tilt, and zoom transformations, projections, mirroring, rotations (for roll and yaw), and changes of the camera position.

In an embodiment of the method according to the present invention, the transforming comprises one or more of scaling, shearing, rotating, reflecting, projecting, and translating the first video stream.

It is an advantage of this embodiment that the most common transformations occurring in a primary video stream can be applied to the secondary video stream.

In an embodiment, the method according to the present invention further comprises receiving first depth information associated with the transformation information signal, and the transforming is performed in a three-dimensional space in accordance with the first depth information.

In an embodiment, the method according to the present invention further comprises receiving second depth information associated with the second video signal, and the transforming is performed in a three-dimensional space in accordance with the second depth information.

It is an advantage of these embodiments that the blending of the video signals becomes even more natural, as the object of the second video signal will behave consistently in the represented three-dimensional space—even if the resulting mixed video is represented as a two-dimensional video signal. The 3D transformation may be performed on the basis of depth information associated with the second video signal and/or depth information associated with the transformation information signal. For example, even if the second video signal is provided as a two-dimensional signal (no depth information), it may still be transformed in three-dimensional space in accordance with the depth information associated with the transformation information.

In an embodiment, the method according to the present invention further comprises third receiving depth information associated with the first video signal.

It is an advantage of this embodiment that the blending of the video signals becomes even more natural, as the object of the second video signal will behave consistently in the represented three-dimensional space, which can also be rendered three-dimensionally.

In an embodiment of the method according to the present invention, the first video signal and the transformation information signal are received as different channels of an encoded video stream.

It is an advantage of this embodiment that standardized multi-channel encoding formats can be used for the transmission of video streams with inherent mixing capabilities. It is a further advantage of this embodiment that time synchronization between the main channel (the first video signal) and the mixing channel (the transformation information signal) is simplified.

According to an aspect of the invention, there is provided a computer program comprising software means configured to perform, when executed, the method as described above.

According to an aspect of the invention, there is provided an apparatus for mixing a first video signal and a second video signal, the apparatus comprising: a first video input interface for receiving the first video signal; a second video input interface for receiving the second video signal; a transformation information interface for receiving a transformation information signal dividing the first video signal into a transparent region and a non-transparent region and representing a spatial relationship between the first video signal and the second video signal; a transformation processor, operatively coupled to the second video input interface and the transformation information interface, the transformation processor being configured to transform the second video signal in accordance with the transformation information signal; and a mixing processor, operatively coupled to the first video interface and the transformation processor, the mixing processor being configured to combine the non-transparent region of the first video signal with a portion of the transformed second video signal, the portion of the transformed second video signal being rendered in the transparent region of the first video signal.

In an embodiment of the apparatus according to the present invention, the transformation processor is configured to apply one or more of scaling, shearing, rotating, reflecting, projecting, and translating of the second video signal.

In an embodiment of the apparatus according to the present invention, the transformation information interface is further adapted to receive first depth information associated with the transformation information signal, and the transformation processor is configured to transform the second video signal in a three-dimensional space in accordance with the first depth information.

In an embodiment of the apparatus according to the present invention, the second video input interface is further adapted to receive second depth information associated with the second video signal, and the transformation processor is configured to transform the second video signal in a three-dimensional space in accordance with the second depth information.

In an embodiment of the apparatus according to the present invention, the first video input interface is further adapted to receive third depth information associated with the first video signal.

According to an aspect of the invention, there is provided a video stream for use in the method as described above, the video stream comprising the first video signal as a main channel, and the transformation information signal as an additional channel.

In an embodiment, the video stream according to the present invention further comprises depth information.

The depth information may pertain to the first video signal and/or the transformation information signal.

According to an aspect of the invention, there is provided a video server configured for providing the video stream as described above.

The effects and advantages of embodiments of the apparatus, video stream, and server according to the present invention are the same, mutatis mutandis, as those of the corresponding embodiments of the method according to the present invention.

BRIEF DESCRIPTION OF THE FIGURES

Some embodiments of apparatus and/or methods in accordance with embodiments of the present invention are now described, by way of example only, and with reference to the accompanying drawings, in which.

DESCRIPTION OF EMBODIMENTS

Figure 1:
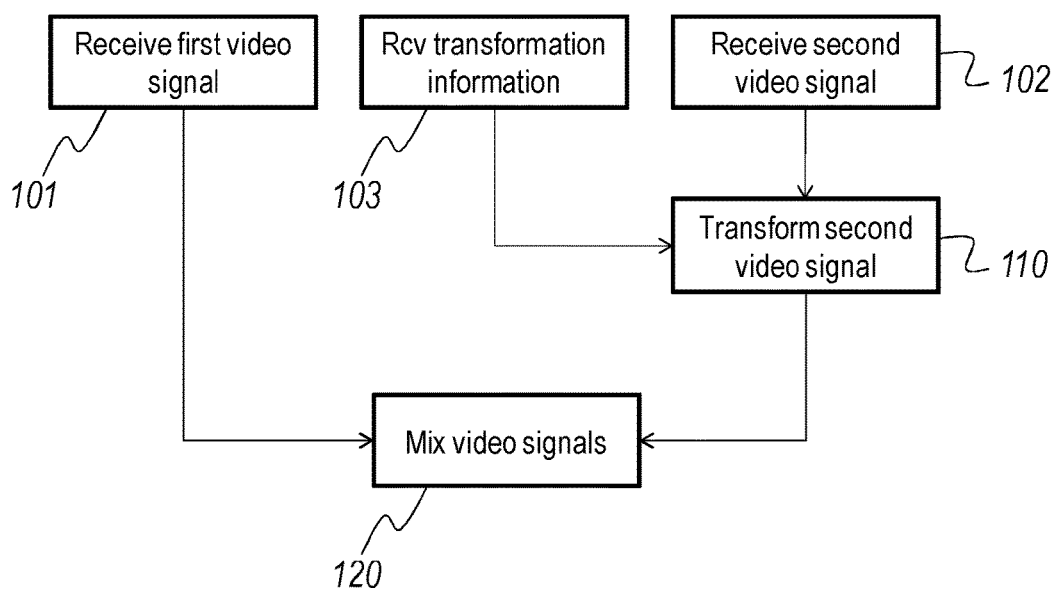
FIG. 1 provides a flow chart of a method according to an embodiment of the present invention.

In existing picture-on-video overlaying methods, parts of the picture can be transparent, if the selected picture format supports transparency (e.g., the PNG or SWF format).

In that case, the video behind the picture can "peek through" the transparent areas. If the overlaying tool supports MNG (Moving PNG), multiple multimedia formats can be overlayed where the transparent areas in the MNG video will allow the underlying multimedia formats to peek through. Since modern browsers support MNG, (unsynchronized) MNG video overlay on video is presently supported at a general level.

Existing solutions don't allow a secondary live (3D) video stream to be overlayed in depth with a first (3D) video stream. It is therefore not possible to define a static or dynamic 3D region—with alpha and depth—in the first video stream where the second (3D) video stream will become visible.

The main components of 2D or 3D multimedia formats such as video are the color information (e.g., RGB, YUV or HSV), depth information (typically a scalar or "gray scale" value), and transparency or "alpha" information (also a scalar or "gray scale" value). Embodiments of the present invention are based on the insight that the aforementioned real-time seamless mixing of video streams can be made possible by including additional information channels into such multimedia formats.

Multimedia formats to which this invention is applicable are still image encoding/container formats, which include without limitation: PNG, GIF, JPG, TIFF, RIFF, WebP, SVG, and BMP, and moving image encoding/container formats, which include without limitation; MNG, animated GIF, MPEG, AVI, WMV, MOV, RM, 3GP, VP8, WebM, Theora, Ogg, and OGM. Where reference is made to video encoding, codes such as H.264, HEVC, and other codecs known to the person skilled in the art may be used.

Embodiments of the present invention are based inter alia on the insight of the inventors that it is advantageous to include in a first multimedia format an array of channels each containing color, depth and transparency information where each channel defines a unique region in that first multimedia format where a second multimedia format received from another independent source is allowed to mix in (blend in). Accordingly, embodiments of the present invention enable mixing at the client side in real-time. However, the invention may also be applied to enable mixing at a server side, e.g. on a video server residing in the core network or the access network. The color, depth as well as the transparency information of each channel can additionally be defined as a mathematical 2D or 3D region, as a sculpted 3D region, or as any other viable 2D/3D region definition.

For ease of understanding, the video stream comprising the transparent portions will hereinafter be designated as "primary video stream", while the stream(s) comprising the visual information to appear in said transparent portions, i.e. the stream(s) shown "behind" the first video stream and peeking through the latter's transparent regions, will be designated as the "secondary video stream(s)". When "secondary video stream" is used in singular form, this is not intended to exclude embodiments where multiple secondary video streams are mixed in.

The terms "primary video stream" and "secondary video stream" are used without loss of generality, and in particular don't preclude a "stacked" or recursive usage in which the second video stream also includes transparent regions for the introduction of further (lower-order) streams. In addition, the usage of the term "video" does not exclude input feeds which remain unchanged over time (i.e., feeds representing a still image). Accordingly, the invention also covers embodiments where the primary video stream and/or the secondary video stream are in fact represented by a still image in an appropriate format.

The primary video stream comprises a main channel, representing the actual image color information, hereinafter also referred to as the "first video signal". The secondary video stream also comprises a main channel representing the actual image color information, hereinafter also referred to as the "second video signal".

The additional channels that define the unique regions in the primary video stream where insertion of a secondary video stream may occur, will be designated as "mixing channels". At a more abstract level, these channels will also be referred to as "transformation information (signals)", because they define the transformation required to obtain the desired geometric relationship of the primary stream and the mixed-in secondary stream; in particular, the transformation information would include anchoring information, i.e. information defining the place where the mixed-in secondary stream would be anchored down in the primary stream. The transformation information signal is preferably supplied along with the video signal as a separate channel in the same stream, but this is not required; the transformation information may also be provided separately by any appropriate means. The transformation information signal may be dynamic or static, i.e. it may be provided as a moving area in the video scenery or a still image.

It is an advantage of embodiments of the present invention that a platform can be provided in which a primary video signal can be autonomously mixed with one or more secondary video signals using instructions found a transformation information signal and optional instructions from the client (viewer), wherein the different signals may originate from different (distributed) sources, and where the final result of the composition is not predetermined by a central director. Thanks to the (distributed) real-time behavior of the system, only the geometry of the permitted compositions is defined by the originator of the primary stream, not the final result of the composition.

It will be clear from the description that the transformation of the secondary stream and its combination with the primary stream may result in only a portion of the secondary stream being visible. In particular, parts of the secondary stream may be covered by the non-transparent parts of the primary stream, which is rendered as if it were a layer positioned "on top of" the secondary stream. In addition, the required transformation may include transformations such as upscaling, translation, and rotation, which may project certain parts of the original secondary stream to coordinates which lie outside the governing viewport (typically a rectangle with a fixed number of pixels in horizontal and vertical direction).

In accordance with an embodiment of the invention, FIG. 1 illustrates a method for mixing a first video signal and a second video signal, the method comprising at a mixing device: receiving the first video signal 101, receiving the second video signal 102; receiving a transformation information signal 103 dividing the first video signal into a transparent region and a non-transparent region and representing a spatial relationship between the first video signal and the second video signal; transforming 110 the second video signal in accordance with the transformation information signal; and combining 120 the non-transparent region of the first video signal with a portion of the transformed second video signal, the portion of the transformed second video signal being rendered in the transparent region of the first video signal.

The transformation information ensures that the first video stream and the second video stream can be mixed with a consistent spatial interrelation, and preferably synchronized in time. Mathematically, the transformation information can be thought of as an "origin" and a set of base vectors for a reference frame that is fixed in the space represented by the primary video stream.

The transformation information may include one or more assigned properties that define the characteristics for e.g. scaling, sizing, cropping, mirroring, skewing, rotating and filtering. The assigned filter may be applied to the video signal from the secondary channel(s) before mixing.

Preferably, the first video signal and the transformation information signal are provided as a main channel and a mixing channel, respectively, of a primary video stream. In a special case, the primary video stream only comprises transparent regions, and is thus simply a container for any number of mixing channels.

In embodiments of the present invention, the mixing channels are represented as mathematical regions. These regions can be defined with dedicated identifiers or mathematical formulas combined with absolute or relative positions in the 3D video. Examples are a 2D piecewise constant function, and a 2D planar gradient. Such regions can be assigned a single color and a single transparency value. In another embodiment, no color and no transparency value is provided, such that the receiver will fall back to 100% transparency for these regions. In another embodiment, one or more color and transparency gradients can be provided.

Figure 2:
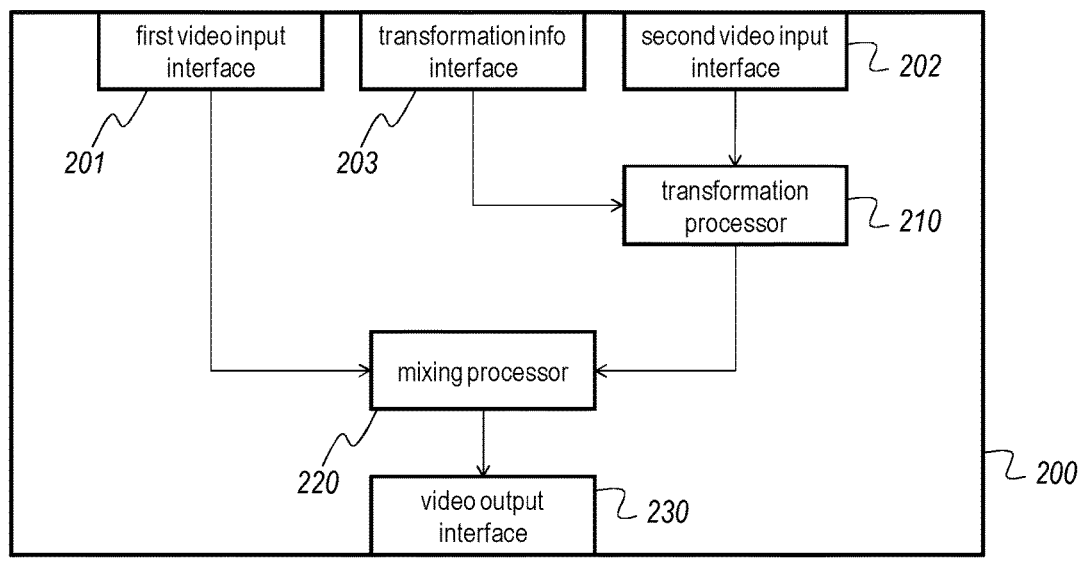
FIG. 2 provides a schematic diagram of an apparatus according to an embodiment of the present invention.

In accordance with an embodiment of the invention, FIG. 2 illustrates an apparatus 200 for mixing a first video signal and a second video signal, the apparatus comprising: a first video input interface 201 for receiving the first video signal; a second video input interface 202 for receiving the second video stream; a transformation information interface 203 for receiving a transformation information signal dividing the first video signal into a transparent region and a non-transparent region and representing a spatial relationship between the first video signal and the second video signal; a transformation processor 210, operatively coupled to the second video input interface 202 and the a transformation information interface 203, the transformation processor 210 being configured to transform the second video signal in accordance with the transformation information signal; and a mixing processor 220, operatively coupled to the first video interface 201 and the transformation processor 210, the mixing processor 220 being configured to combine the non-transparent region of the first video signal with a portion of the transformed second video signal, the portion of the transformed second video signal being rendered in the transparent region of the first video signal.

Although multiple interfaces 201, 202, 203 are being recited hereinabove, this is done without loss of generality, and it does not preclude implementations in which the same interface is used to fulfill several functions. The term "interface" designates the necessary hardware and software required to establish data communication between different parts of a software platform (e.g., an application programming interface, API), between a storage medium and a software platform, or between nodes in a communication network, as is well known to a person skilled in the art. Preferably, standardized protocols are used. In a subscriber access network, an access interface may for instance include an interface for an xDSL, xPON, WMAN, or 3G link. A LAN interface may for instance include an interface for one or more of an IEEE 802.3 "Ethernet" link, an IEEE 802.11 "Wireless LAN" link. A PAN interface may for instance include a USB interface or a Bluetooth interface.

The transformation information signal is preferably bundled with the first video signal in the form of one or more mixing channels, using a video encoding scheme that allows the bundling of multiple channels.

Figure 3:
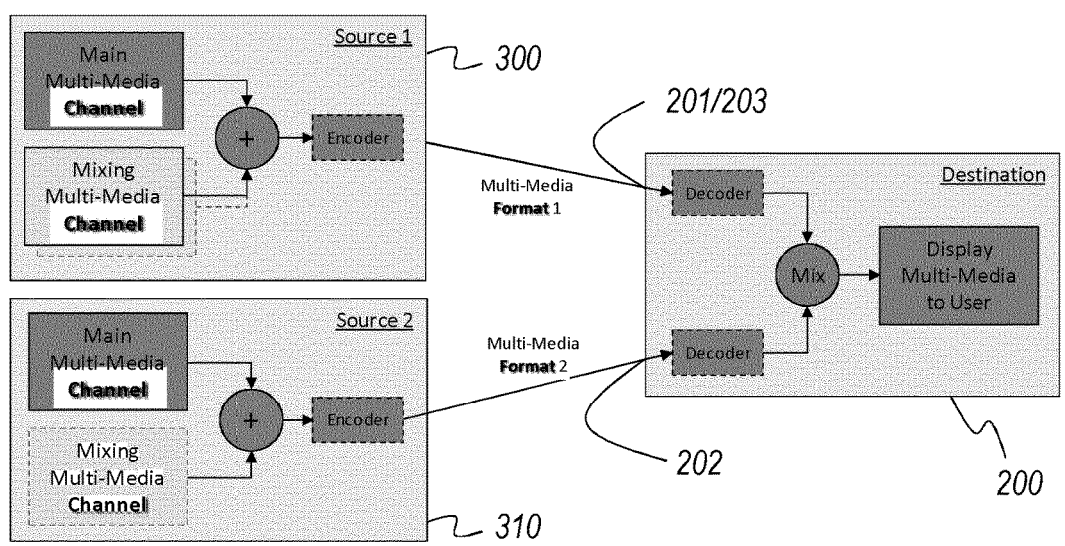
FIG. 3 illustrates an exemplary application of the present invention.

FIG. 3 schematically illustrates an exemplary application, wherein an apparatus 200 according to the invention is arranged to receive a primary video stream via a first interface 201/203 from a first video server 300. In accordance with the invention, the first video server 300 provides the primary video stream comprising the first video signal and the transformation information signal, as a main channel and a mixing channel, respectively. The apparatus 200 is further arranged to receive a secondary video stream via a second interface 202 from a second video server 310. The second video server 310 may also be configured to include one or more mixing channels in the secondary video stream, but this is not required. At the apparatus 200, the received video streams are decoded, the second video signal extracted from the secondary video stream is transformed as described above, and a mixed video signal is produced in accordance with the transformation information on the basis of the first video signal and the transformed second video signal.

The alignment of the mixing regions can be done automatically or on (real-time) user input. When more than one mixing region is available, the selection of the region may be done automatically or on (real-time) user input. Additional processing of the second video signal can optionally be activated and/or tuned by the user.

The methods and apparatus according to the invention can for instance be used for 2D multimedia formats to support motion parallax. Indeed, the changing location of e.g. a transparent window (in a house or office building) in a video recording (first multimedia format) mixed with the static location of e.g. a person in another video recording (second multimedia format) will cause the person to move relative to the movement of the camera in the first video recording.

The transformation information, preferably in the form of a mixing channel, may define the 2D area of the window as transparent and a large 3D area directly behind the window. When this 2D video is mixed with a secondary 2D or 3D video, the secondary video will be mixed in a different position depending on the point of view of the camera of the primary video.

If the primary video is a non-interactive video stream (e.g., a conventional motion picture) the point of view of the camera is implied by the supplied video stream. The same holds for content generated in real time, in which a (human or automated) director makes all choices regarding what should be captured. However, the invention also applies to situations in which the end user, viewer of the combined video stream, has control over the point of view of the camera. Such control may be exercised by means of conventional user interfaces (mouse and/or keyboard, gesture detection, etc.), or by actual movements of the viewer in the physical space in front of the display, in which case these movements must be captured by means of adequate sensors, as are known in the field of virtual reality.

Figure 4:
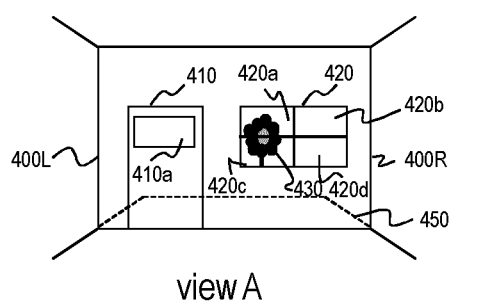
FIG. 4 illustrates an exemplary application of the present invention.
Figure 4:
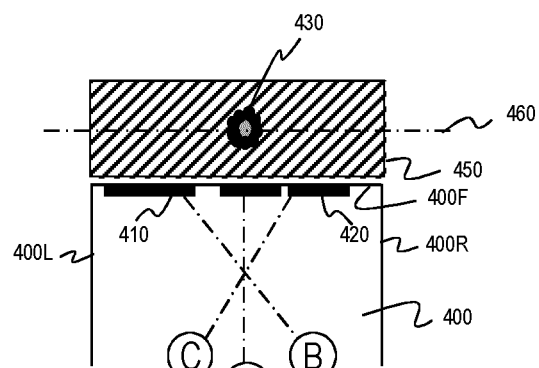
Figure 4:
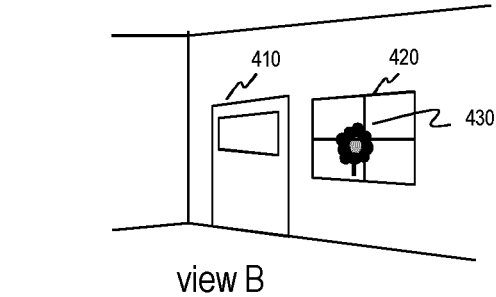
Figure 4:
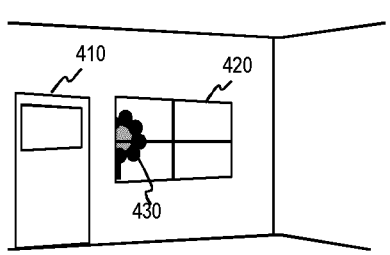

FIG. 4 illustrates this effect schematically with an exemplary application. The primary video stream is shot inside a house 400, delimited by a front wall 400F with a door 410 and a window 420. The skilled person will appreciate that the house may alternatively be a studio arranged to look like a house, or a rendering of an appropriate computer-generated 3D scenery. The door 410 is provided with a transparent pane 410a, and the window 420 is provided with transparent panes 420a-d, through which a virtual "outside scenery" can be seen. The "outside scenery" is limited to the region 450 which is represented as a hashed rectangle in the top view at the right side of FIG. 4, and as a rectangle in dashed lines in view A at the top left of FIG. 4.

In this setting, the combination of transparent regions 410a and 420a-d with the spatial region 450 defined just outside the house defines a mixing region, in which content from a secondary video stream may be mixed. This mixing region is specified by transformation information, which is preferably provided in the form of one or more mixing channels. In the illustrated example, a secondary video stream is provided, comprising an image of a single sunflower 430, moving in the wind. In general, the secondary stream may be a 3D stream (video signal with depth information), or a 2D stream.

According to the invention, transformation information will be used to spatially bind the secondary stream to the primary stream. In this particular case, the sunflower 430 of the outside scenery will remain at a fixed point with reference to the mixing region 450. If the outside scenery is provided as a 2D stream, it may be introduced into the scenery as a rectangular screen at the location of the dot-dashed projection line 460. It should be noted that the original secondary stream may have to be scaled and/or transformed to conform with the geometry of a "rectangle" as seen in the perspective governing the primary video stream—in particular, rectangular shapes may be transformed into trapezoids. If the outside scenery is provided as a 3D stream, it should be rendered correctly in three dimensions in so far as its contents fall within the boundaries of the depth defined by the mixing region 450. The primary video signal, with its transparent regions 410a and 420a-d, is then placed on top of the outside scenery as an overlay, showing the inside of the house with appropriate portion of the outside scenery being visible through the window and door panes.

Three exemplary camera positions A, B, C, with their respective directions of view, are illustrated in the top view on the right side of FIG. 4. The three views on the left side of FIG. 4 correspond to these camera positions. View A represents a view taken by a camera pointed orthogonally towards the center of the front wall 400F of the house. The sunflower 430 is completely visible through panes 420a and 420c without any distortion other than scaling. View B represents a view taken by a camera that is slightly to the right of the camera of view A, wherein the camera is pointed more towards the left wall 400L.

Accordingly, the image of the sunflower 430 will move to the right relative to the edges of the window 420. A part of the sunflower 430 can still be seen through panes 420a and 420c, while the remainder has moved into panes 420b and 420d. View C represents a view taken by a camera that is slightly to the left of the camera of view A, wherein the camera is pointed more towards the right wall 400R. Accordingly, the image of the sunflower 430 will move to the left relative to the edges of the window 420. Only a part of the sunflower 430 can still be seen through panes 420a and 420c, while the remainder is now being blocked from view by the front wall 400F.

Preferably, the mixing channels include one or more of color information, depth information, and transparency information. If a mixing channel does not include color information, the color information required for appropriate rendering of the mixed video stream will be provided by the secondary video streams that are mixed with the first one. If color information is supplied, it will be mixed in accordance with its level of transparency, with the color information of the secondary video streams.

The main and mixing video channels in the primary and secondary video streams do not necessarily have to be in the same dimension. Accordingly, each of the main channel and the mixing channel or channels may be two-dimensional or three-dimensional.

In addition, each of the main channel and the mixing channel or channels may include one or more viewpoints. In the example of FIG. 4, the three camera viewpoints A, B, C may be included in the primary video stream. The secondary video will be mixed in a different position depending on the point-of-view point that the user selects for the primary video. This technique can also be applied in cases where the primary channel is a still instead of a moving image.

In another embodiment, a 3D secondary video may be displayed in 3D while the single point-of-view 2D primary video remains in 2D.

Another exemplary application of the invention is a 3D video of a room where different 3D transparent areas are provided around a table. The (3D) video streams (with background removal) of individual remotely located users can then be blended into the transparent areas. Depending on the selected point of view, the table and the video streams of some participants will be partially or fully in front of some of the other participants. This is similar to the real world where a table or a person partially blocks the view of the complete person, e.g. the person's legs under the table.

Figure 5:
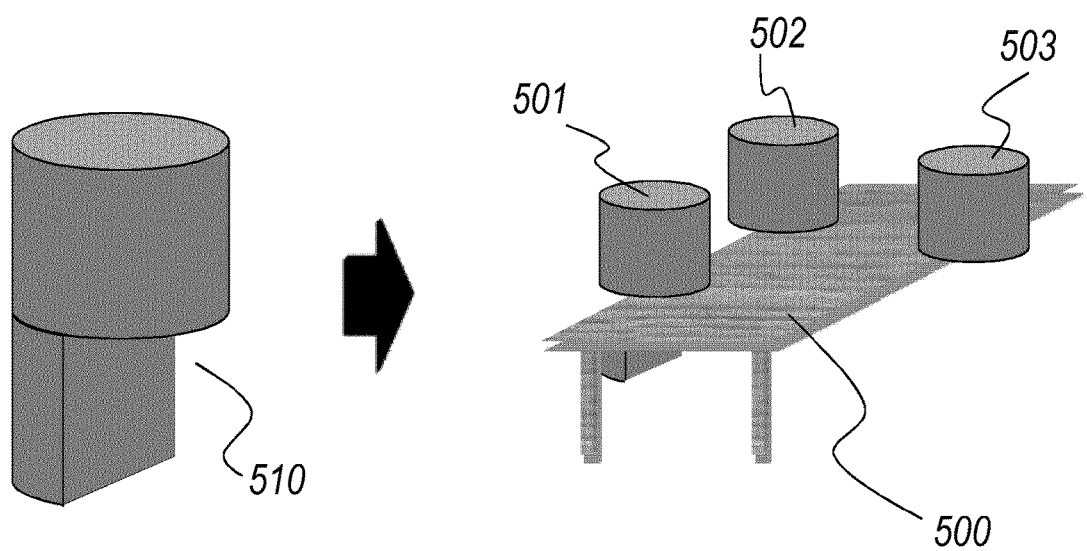
FIG. 5 illustrates an exemplary application of the present invention.

FIG. 5 illustrates such an exemplary application of the invention, in which the mixing region is represented by a cylinder 510, wherein the forward-facing half of the lower half is removed. One or more such mixing regions 501, 502, 503 can easily be positioned around a table 500, such that the remaining forward-facing part in the upper half is positioned over the table 500 while the entire backward-facing half is positioned behind the table 500. When a secondary video of a e.g. person sitting at a table is aligned with the primary video, the 3D image of the person in the secondary video will appear as sitting at the table 500 of the primary video, even when he is leaning on the table. When there is perfect alignment, papers or items present on the table in the secondary video will also be visible in the mixed video.

In the context of the present invention, in particular in view of the embodiment illustrated in FIG. 5, it is not desirable to require that users manually rotate the secondary signal(s) in order to position the images of their correspondents to face the table. In an advantageous embodiment, one or more of the channels therefore includes an additional property that facilitates automatic alignment. This property may include one or more of a vector identified by a center coordinate and a normal or frontal coordinate, a 2D/3D scaling factor, and a unit of measurement or size calibration factor. Auto-alignment of the image can be obtained by appropriately aligning the vector(s) in space in accordance with their desired (virtual) position within the scenery.

Although methods and apparatus have been described hereinabove as separate embodiments, this is done for clarity purposes only, and it should be noted that features described only in connection with method embodiments may be applied in the apparatus according to the present invention to obtain the same technical effects and advantages, and vice versa.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus, comprising:
at least one processor; and
at least one memory including computer program code;
the at least one memory and computer program code configured to, with the at least one processor, cause the apparatus at least to perform at least the following:
 receiving a first video signal as a main channel of a primary video stream;
 receiving a second video signal;
 receiving a transformation information signal dividing said first video signal into a transparent region and a non-transparent region and representing a spatial relationship between said first video signal and said second video signal, which defines a place where images comprised in the second video signal would be anchored down in images comprised in the first video signal;
 transforming said second video signal in accordance with said transformation information signal;
 combining said non-transparent region of said first video signal with a portion of said transformed second video signal; and
 rendering said portion of said transformed second video signal in said transparent region of said first video signal;
 wherein the transformation information signal is provided as a mixing channel of said primary video stream.

2. A method, comprising:
receiving a first video signal as a main channel of a primary video stream;
receiving a second video signal;
receiving a transformation information signal dividing said first video signal into a transparent region and a non-transparent region and representing a spatial relationship between said first video signal and said second video signal, which defines a place where images comprised in the second video signal would be anchored down in images comprised in the first video signal;
transforming said second video signal in accordance with said transformation information signal;
combining said non-transparent region of said first video signal with a portion of said transformed second video signal; and
rendering said portion of said transformed second video signal in said transparent region of said first video signal;

wherein the transformation information signal is provided as a mixing channel of said primary video stream.

3. A method according to claim 2, wherein said first video signal is representing a scene and said second video signal is representing an object to be anchored down within said scene.

4. The apparatus according to claim 1, wherein the mixing channel is represented as a mathematical region.

5. The apparatus according to claim 4 wherein the mathematical region is definable by means of a dedicated identifier or by a mathematical formula in combination with the absolute or relative position coordinates.

6. The apparatus according to claim 1, wherein the transformation information signal includes transformation information that defines characteristics for all of scaling, mirroring, rotating, projecting and translating said second video signal.

7. The method according to claim 2, wherein the mixing channel is represented as a mathematical region.

8. The method according to claim 7, wherein said mathematical region is definable by means of a dedicated identifier or mathematical formula in combination with absolute or relative position coordinates.

9. The apparatus according to claim 1, wherein said first video signal and said transformation information signal are received as different channels of an encoded video stream.

10. The apparatus according to claim 1, wherein said first video signal is representing a scene and said second video signal is representing an object to be anchored down within said scene.

11. The apparatus according to claim 1, wherein the at least one memory and computer program code are further configured to, with the at least one processor, cause the apparatus to perform:
receiving first depth information associated with said transformation information signal; and
transforming said second video signal in a three-dimensional space in accordance with said first depth information.

12. The apparatus according to claim 1, wherein the at least one memory and computer program code are further configured to, with the at least one processor, cause the apparatus to perform:
receiving second depth information associated with said second video signal; and
transforming said second video signal in a three-dimensional space in accordance with said second depth information.

13. The apparatus according to claim 1, wherein the at least one memory and computer program code are further configured to, with the at least one processor, cause the apparatus to perform: receiving third depth information associated with said first video signal.

14. A method according to claim 2, wherein the transformation information signal includes transformation information that defines characteristics for one or more of scaling, mirroring, translating, projecting and rotating of said second video signal.

15. The method according to claim 14, wherein said first video signal and said transformation information signal are received as different channels of an encoded video stream.

16. A non-transitory computer-readable medium including computer readable instructions, which when executed by a processor, cause the processor to perform the method of claim 2.

17. A video stream for use in the method according to claim 2, said video stream comprising said first video signal as a main channel, and said transformation information signal as an additional channel.

18. The video stream according to claim 17, further comprising depth information.

19. A video server configured for providing the video stream according to claim 17.

* * * * *